United States Patent
Stewart et al.

(10) Patent No.: US 8,567,221 B2
(45) Date of Patent: Oct. 29, 2013

(54) SPOOL LOCK

(76) Inventors: Tanner Kyle Stewart, Edmonton (CA);
Adrien Patrick Lombard, Yarmouth (CA)

( * ) Notice: Subject to any disclaimer, the term of this patent is extended or adjusted under 35 U.S.C. 154(b) by 71 days.

(21) Appl. No.: 13/209,627

(22) Filed: Aug. 15, 2011

(65) Prior Publication Data
US 2012/0037747 A1 Feb. 16, 2012

Related U.S. Application Data

(60) Provisional application No. 61/373,625, filed on Aug. 13, 2010.

(51) Int. Cl.
*E05B 73/00* (2006.01)

(52) U.S. Cl.
USPC ............ 70/19; 70/61; 70/174; 70/211; 70/225

(58) Field of Classification Search
USPC ........... 70/19, 58, 59, 61, 163, 164, 174, 190, 70/191, 209–212, 225–228, 258–260
See application file for complete search history.

(56) References Cited

U.S. PATENT DOCUMENTS

| 923,867 | A | | 6/1909 | Luethy | |
|---|---|---|---|---|---|
| 1,971,797 | A | * | 8/1934 | Shinn | 70/32 |
| 4,126,211 | A | | 11/1978 | Blosser | |
| 4,135,683 | A | | 1/1979 | Stephenson et al. | |
| 4,216,365 | A | | 8/1980 | Peyrot | |
| 4,391,420 | A | | 7/1983 | Ahad et al. | |
| 5,056,735 | A | | 10/1991 | Gelardi et al. | |
| 5,150,790 | A | | 9/1992 | Forgette | |
| 5,356,089 | A | | 10/1994 | Abe | |
| 5,522,561 | A | | 6/1996 | Koyamatsu et al. | |
| 5,638,706 | A | * | 6/1997 | Stevens | 70/19 |
| 5,799,513 | A | * | 9/1998 | Nathan et al. | 70/14 |
| 5,832,755 | A | * | 11/1998 | Crilly | 70/58 |
| 5,899,402 | A | | 5/1999 | Koning | |
| 5,918,488 | A | * | 7/1999 | Deeter | 70/14 |
| 6,488,225 | B2 | | 12/2002 | Maegawa | |
| 6,519,983 | B2 | * | 2/2003 | Witchey | 70/209 |
| 6,749,094 | B1 | * | 6/2004 | Dexel | 70/259 |
| 6,834,896 | B2 | * | 12/2004 | Smith | 70/19 |
| 6,880,375 | B1 | * | 4/2005 | Pettingill et al. | 70/226 |
| 7,234,371 | B1 | * | 6/2007 | Ritz | 70/19 |

FOREIGN PATENT DOCUMENTS

| CA | 1 185 219 | | 4/1985 |
|---|---|---|---|
| CN | 2662511 | | 12/2004 |
| CN | 201113347 | | 9/2008 |
| GB | 2462430 | A | 10/2010 |
| WO | 96/28349 | | 9/1996 |
| ZA | 20032307 | | 4/2004 |

* cited by examiner

*Primary Examiner* — Christopher Boswell
(74) *Attorney, Agent, or Firm* — Davis & Bujold, PLLC; Michael J. Bujold

(57) ABSTRACT

A lock for locking adjacent spools that have parallel, non-collinear adjacent axes of rotation has first and second locking plates with spool-engaging surfaces. A locking member connects the locking plates. The locking member is connected to an intermediate position on each of the first and second locking plates. The locking member has a release position and a locking position. In the locking position, the spool-engaging surfaces clamp against adjacent spools.

8 Claims, 5 Drawing Sheets

SPOOL LOCK

FIELD

This relates to a lock for adjacent spools, such as spools that hold welding cables.

BACKGROUND

With the rise in commodity prices, theft of cables, such as welding cables, has increased. One method of locking the cables includes a flexible sheet of material that is wrapped around the spools and secured to restrict access to the cables.

SUMMARY

There is provided a lock for locking adjacent spools that have parallel, non-collinear adjacent axes of rotation. The lock comprising first and second locking plates, each plate having first and second spool-engaging surfaces. A length-adjustable member connects the locking plates. The length-adjustable member is positioned between the first and second spool-engaging surfaces with the spool-engaging surfaces of each plate facing the other spool-engaging surface. The length-adjustable member has a release position and a locking position. In the locking position, the first spool-engaging surfaces engaging a first spool, and the second spool-engaging surfaces engaging a second spool.

According to other aspects, the locking plates may be angled outward from the length-adjustable member. The length-adjustable member may be a threaded rod that is attached to the first locking plate, and is engaged by a threaded nut at the second locking plate. The threaded nut may have handles for rotating the threaded nut. The threaded nut may comprise a lock for securing the threaded nut to the second locking plate to prevent rotation of the threaded nut relative to the second locking plate.

According to another aspect, there is provided a lock for locking adjacent spools that have parallel, non-collinear adjacent axes of rotation. The lock comprises first and second locking plates having spool-engaging surfaces; and a locking member connecting the locking plates. The locking member is connected to an intermediate position on each of the first and second locking plates. The locking member has a release position and a locking position. In the locking position, the spool-engaging surfaces clamps against adjacent spools.

According to other aspects, each spool engaging surface may face toward or away from the other spool engaging surface. The locking member may be a pivoting linkage.

According to other aspects, locking member may be a length-adjustable member, and the locking plates may be angled outward from the length-adjustable member; the length-adjustable member may be a threaded rod that is attached to the first locking plate, and is engaged by a threaded nut at the second locking plate; the threaded nut may have handles for rotating the threaded nut; and the threaded nut may comprise a lock for securing the threaded nut to the second locking plate to prevent rotation of the threaded nut relative to the second locking plate.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
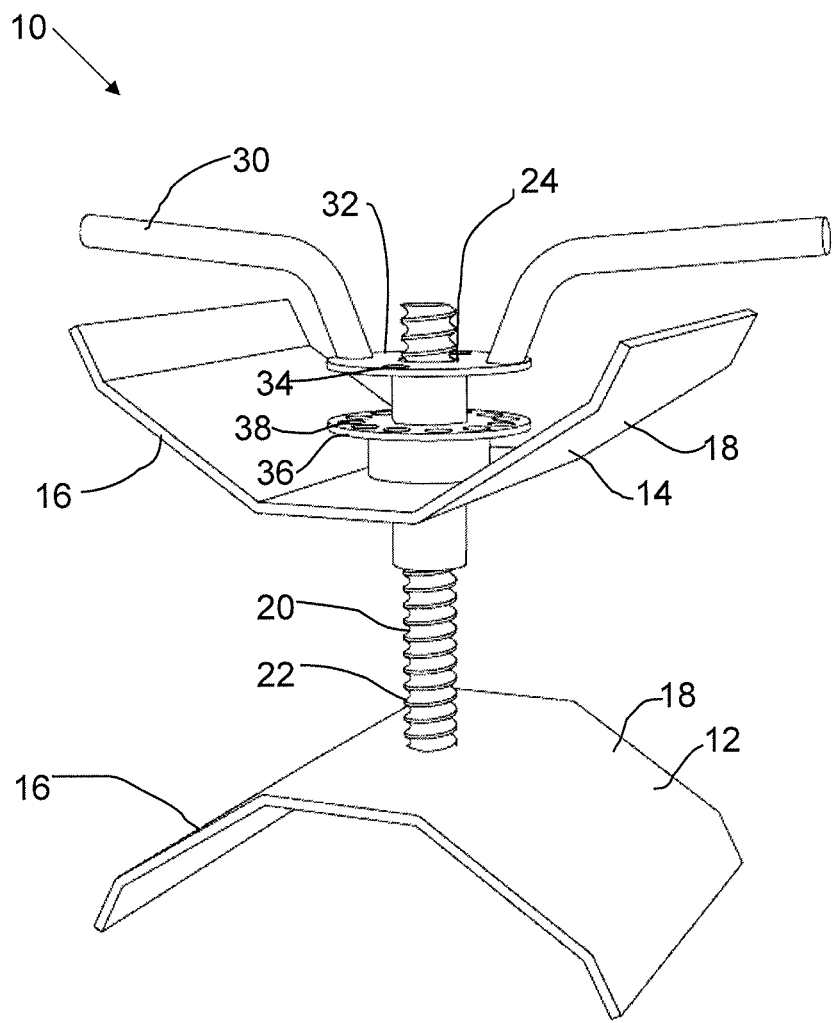
FIG. 1 is a perspective view of the spool lock.

A lock for locking adjacent spools, generally identified by reference numeral 10, will now be described with reference to FIG. 1 through 4.

Figure 4:
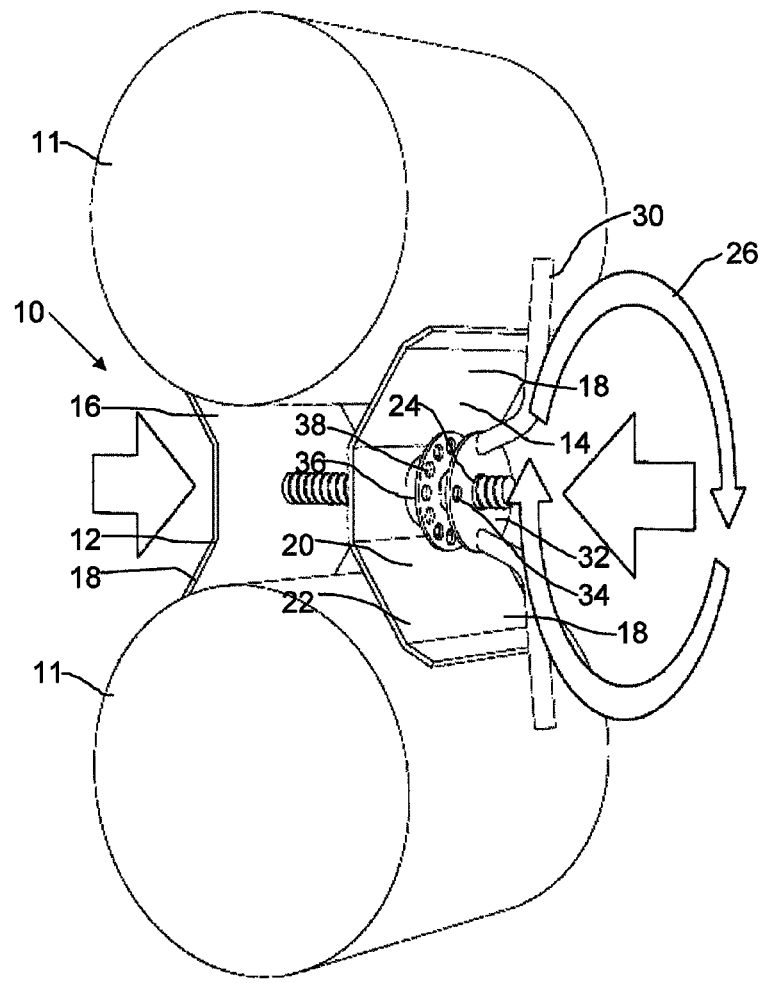
FIG. 4 is a side elevation view of the spool lock.

Referring to FIG. 4, lock 10 is used to lock spools 11 that have parallel, non-collinear axes of rotation that are immediately adjacent. Referring to FIG. 1, lock 10 has first and second locking plates 12 and 14. Plates 12 and 14 each have first and second spool-engaging surfaces 16 and 18. It will be understood that spools 11 may have various cross-sectional designs to engage spools 11. As depicted, plates 12 and 14 may be generally U-shaped with straight segments making up the U. Surfaces 16 and 18 may angle outward at an angle that is approximately the tangent of the spool at that location, or plates 12 and 14 may be engage spools 11 at a corner in each engaging surface 16 and 18 to increase the clamping pressure at the point of contact.

Plates 12 and 14 are connected by a length-adjustable member 20. Length-adjustable member 20 is positioned on each plate 12 and 14 between first and second spool-engaging surfaces 16 and 18, such that the spool-engaging surfaces 16 and 18 of each plate 12 and 14 facing the other spool-engaging surfaces. Referring to FIG. 4, length-adjustable member 20 has a release position and a locking position. As depicted, length-adjustable member 20 is a threaded bar 22, and plates 12 and 14 are moved between the release position and the locking position by rotating a threaded nut 24, as shown by the arrows 26. In the locking position, the first spool-engaging surfaces 16 and the second spool-engaging surfaces each engage a respective spool 11 and clamp against it.

Figure 2:
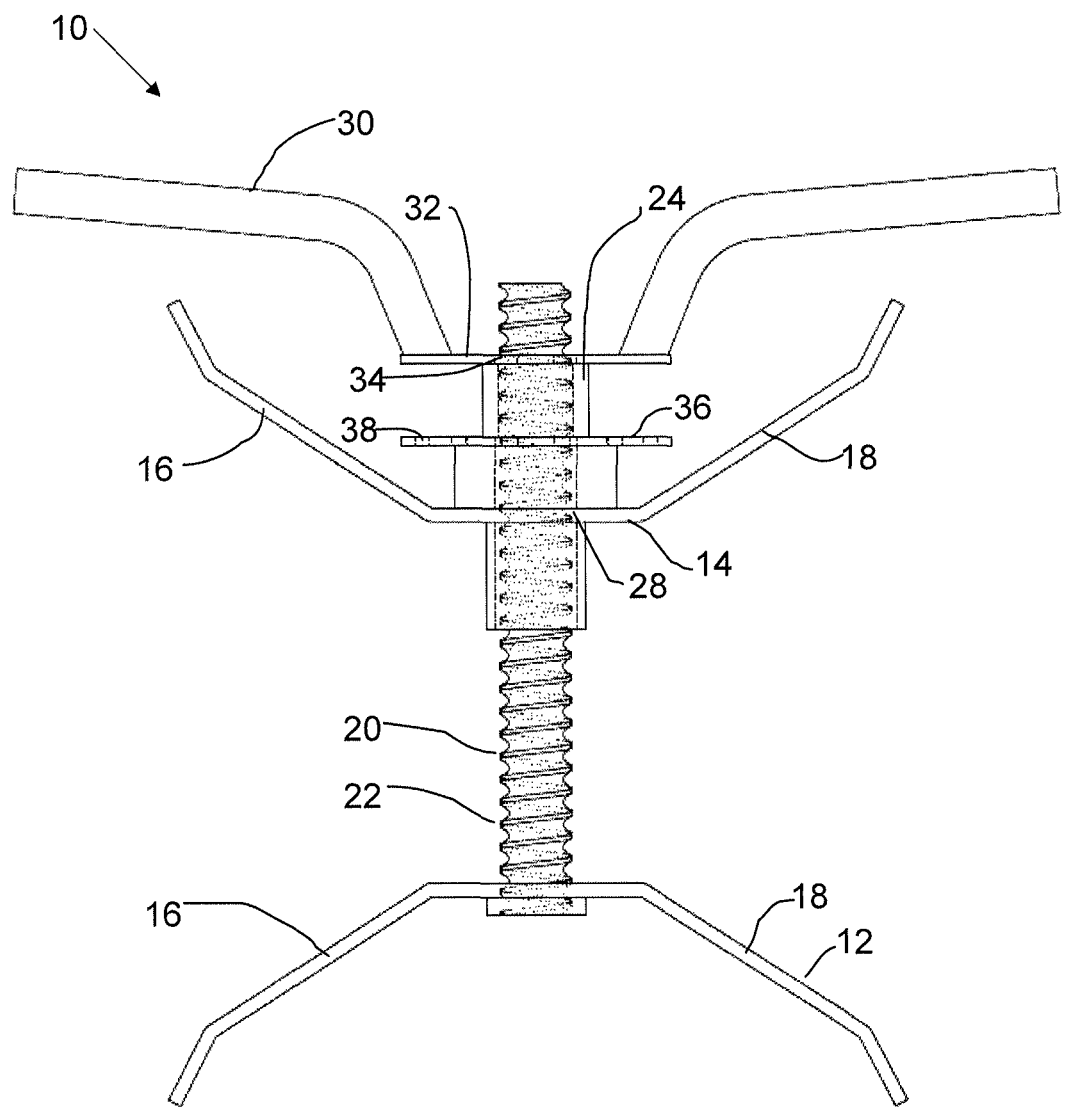
FIG. 2 is a partially transparent side elevation view of the spool lock.
Figure 3:
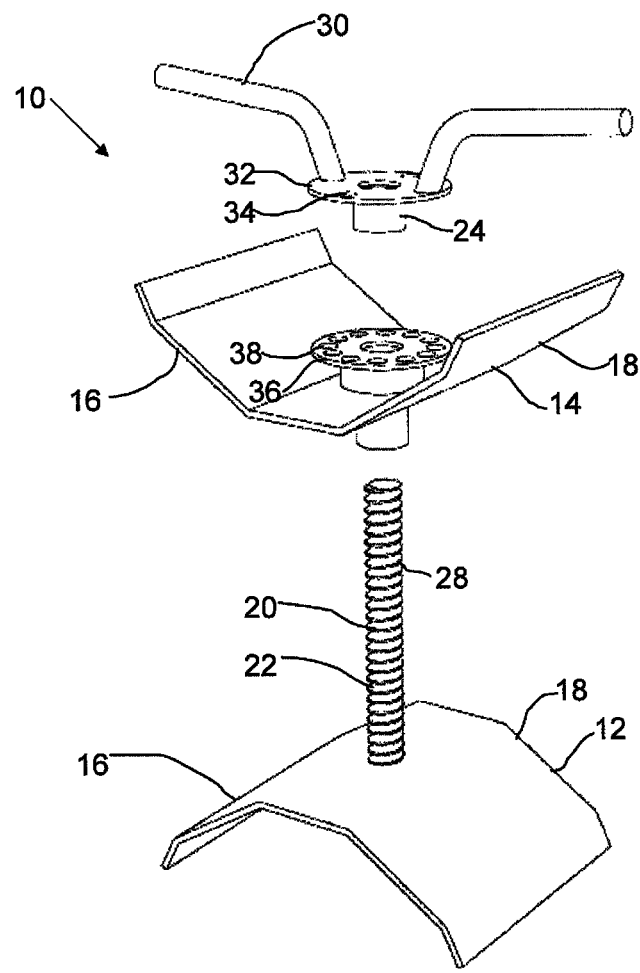
FIG. 3 is an exploded view of the spool lock.

Referring to FIGS. 2 and 3, in the depicted embodiment, threaded bar 22 is secured to first plate 12. Preferably, this is done in a temper-proof manner, such as by welding. Threaded bar 22 then passes through a hole 28 in second plate 14, where it is engaged by threaded nut 24. Threaded nut 24 has handles 30 attached to it to allow it to be easily rotated. Referring to FIG. 4, as it is rotated, it moves along threaded bar 22 to either apply a clamping force, or release the clamping force. When in the locking position, with spools 12 clamped between plates 12 and 14, it is desirable to prevent threaded nut 24 from being removed without authorization. Accordingly, nut 24 is provided with a locking mechanism, in the form of a flange 32 with an apertures 34 is provided on nut 24, and a corresponding flange 36 with apertures 38 are provided on second plate 14. A lock, such as a padlock (not shown) may then be passed through aperture 34 on nut 24 and a corresponding aperture 38 on second plate 14.

While not shown, spools 12 generally have plates on either end to contain the cables wrapped on them. in some embodiments, plates 12 and 14 are designed to fit tight between these end plates to limit access to any loops of cable.

Variation

Figure 5:
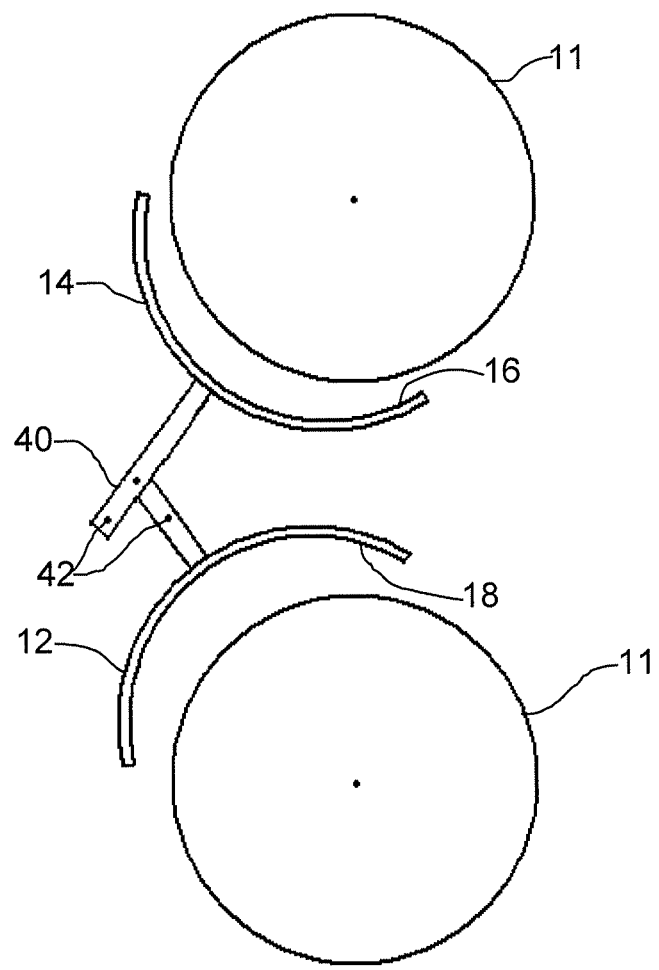
FIG. 5 is a side elevation view of an alternative spool lock.

Referring to FIG. 5, a variation is shown, where the locking mechanism is not a length-adjustable member, but is instead a pivoting linkage 40. Instead of facing each other, plates 12 and 14 have spool-engaging surfaces 42 that face outward, and each plate 12 and 14 only engages one spool 12. Linkage has two holes 42 that align to allow a lock to be placed on them.

Using the principles discussed above, it will be understood that variations of these designs may also exist, where a different type of locking mechanism may be used to cause plates 12 and 14 to clamp against two spools 12, using each spool 12 as the back-stop to prevent rotation of the other spool.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A lock for locking adjacent first and second spools, the first and second spools having fixed parallel, non-collinear adjacent axes of rotation, the lock comprising:

first and second locking plates, each locking plate having first and second spool-engaging surfaces, the first spool-engaging surface of the first locking plate and the first spool-engaging surface of the second locking plate being angled outward from a length-adjustable member to define a first spool engagement receptacle that engages the first spool, and the second spool-engaging surface of the first locking plate and the second spool-engaging surface of the second locking plate being angle outward from the length-adjustable member to define a second spool engagement receptacle that engages the second spool;

the length-adjustable member connecting and controlling the relative position of the locking plates, the length-adjustable member being positioned between the first and second spool-engaging surfaces, the length-adjustable member selectively moving the first and second locking plates together to cause the first and second spool engaging receptacles to apply an outward clamping force on the first and second spools, respectively, the outward clamping force urging the first spool away from the second spool.

2. The lock of claim 1, wherein the length-adjustable member is a threaded rod that is attached to the first locking plate, and is engaged by a threaded nut at the second locking plate.

3. The lock of claim 2, wherein the threaded nut has handles for rotating the threaded nut.

4. The lock of claim 2, wherein the threaded nut comprises a lock for securing the threaded nut to the second locking plate to prevent rotation of the threaded nut relative to the second locking plate.

5. A lock for locking adjacent first and second spools, the first and second spools having fixed parallel, non-collinear adjacent axes of rotation, and the lock comprising:

first and second locking plates, each locking plate defining a spool receiving receptacle; and a locking member connecting the first locking plate to the second locking plate, the locking member being connected to an intermediate position opposite the spool receiving receptacle on each of the first and second locking plates, the locking member having a release position and a locking position, in the locking position, the first and second spool receiving receptacles being positioned between the spools with the first spool receiving receptacle engaging the first spool and the second spool receiving receptacle engaging the second spool, the locking member applying a force to the first and second spool receiving receptacles that results in an outward clamping force applied between the first and second spool receiving receptacles and the first and second spools, respectively.

6. The lock of claim 5, wherein the first spool receiving receptacle faces away from the second spool receiving receptacle.

7. The lock of claim 5, wherein the locking member is a length-adjustable member.

8. The lock of claim 5, wherein the locking member is a pivoting linkage.

\* \* \* \* \*